United States Patent [19]

Saretzky

[11] 4,390,083

[45] Jun. 28, 1983

[54] DOUBLE-CONDUIT CENTRAL LUBRICATING SYSTEM

[75] Inventor: Horst Saretzky, Ennepetal, Fed. Rep. of Germany

[73] Assignee: De Limon Fluhme GmbH & Co., Düsseldorf, Fed. Rep. of Germany

[21] Appl. No.: 252,758

[22] Filed: Apr. 10, 1981

[30] Foreign Application Priority Data

Apr. 16, 1980 [DE] Fed. Rep. of Germany ....... 3014502

[51] Int. Cl.³ ............................................ F16N 25/02
[52] U.S. Cl. .................................... 184/7 F; 184/7 E
[58] Field of Search ............... 184/7 F, 7 E, 7 D, 7 R

[56] References Cited

U.S. PATENT DOCUMENTS

| 3,783,973 | 1/1974 | Kürten et al. | 184/7 E |
| 3,891,057 | 6/1975 | Stevens | 184/7 D |
| 3,915,259 | 10/1975 | Otte | 184/7 E X |
| 4,180,090 | 12/1979 | Bemba | 184/7 F X |

FOREIGN PATENT DOCUMENTS

| 1022059 | 1/1958 | Fed. Rep. of Germany | 184/7 F |
| 1023280 | 1/1958 | Fed. Rep. of Germany | 184/7 F |

OTHER PUBLICATIONS

*Type ZP-Progressiv Lubricant Distributors*, DeLimon Fluhme GmbH & Co., Apr. 1974.

*Lubricant Distributors-Types ZV-B and ZV-C,* DeLimon Fluhme GmbH & Co., Dec. 1974.

*Dual Line Systems for Grease (and Oil)*, DeLimon Fluhme GmbH & Co., Jun. 1975.

Primary Examiner—David H. Brown
Attorney, Agent, or Firm—Martin A. Farber

[57] ABSTRACT

The double-conduit central lubricating system has two feed conduits (I, II) which are supplied from a pump via a switch device which operates as a function of pressure difference and via a change-over valve, at least one double-conduit lubricant distributor being connected to said feed conduits. In order to improve such a system in such a manner that even an extremely different requirement for lubricant at individual rubbing points can be satisfied and that, for instance, lubrication requirements of individual friction points of a ratio of 1:100 can be satisfied precisely in a simple manner with a single lubrication cycle, a control chamber (9, 10) of a progressive distributor (11, 12) is connected to an outlet of the double-conduit lubricant distributor (3, 4, 5) via a control conduit (7, 8) the pressure inlet (13) of said progressive distributor in the initial segment being connected with both feed conduits (I, II). The control chamber (9, 10) of the progressive distributor (11, 12) has no direct connection (13) to the pressure connection of the initial segment.

5 Claims, 1 Drawing Figure

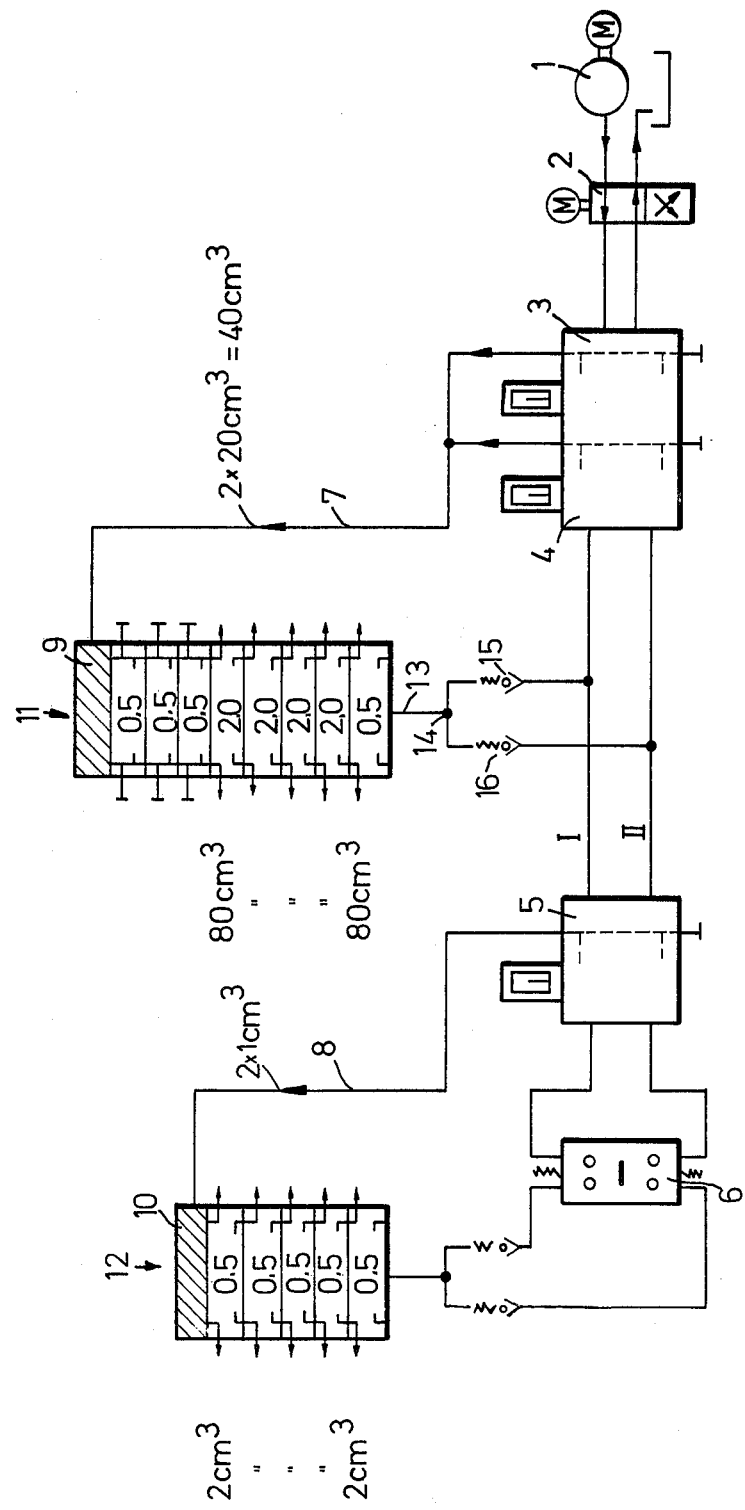

DOUBLE-CONDUIT CENTRAL LUBRICATING SYSTEM

The present invention relates to a double-conduit central lubricating system having two feed conduits which are supplied from a pump via a switch device which operates as a function of pressure difference and via a change-over valve, at least one double-conduit lubricant distributor being connected to said feed conduits.

Such double-conduit central lubricating systems are known preferably for the lubricating of machines and machine installations which have a large number of rubbing points and operate intermittently. The system is in principle of simple construction and can be reduced and increased in size so that it can be readily employed on the most different machines and plants of heavy industry. In this connection, for the supplying of the rubbing points there are used distributors which are of different size corresponding to the amount of lubricant required and the delivery of which can be adjusted, inter alia, by set screws. For this purpose, the lubricant distributors are provided with a dosaging piston and a control piston for every two rubbing points connected, only the associated rubbing point being in each case lubricated depending on whether feed conduit I or feed conduit II is under lubricant pressure. One lubricating cycle therefore covers in principle two lubricating strokes.

Despite these possibilities of variation it frequently happens in practice that the individual friction points of a system require extremely different amounts of lubricant, which requirement cannot be satisfactorily satisfied with a double-conduit central lubricating system. Thus it is for instance possible in one and the same machine for it to be necessary in a single lubricating cycle to supply rubbing points which require only 1 cc of lubricant while the same machine has rubbing points which require 100 cc of lubricant in a single lubricating cycle. Such requirements cannot be satisfied with any of the known lubricating systems, or at least only satisfied with very uneconomical methods. The known single-conduit central lubricating systems with progressive distributors, for instance, are suitable only for the supplying of small and medium-size machine installations with lubricant.

The object of the invention is to improve a double-conduit central lubricating system of the aforementioned type in such a manner that even an extremely different lubricant requirement of individual rubbing points can be satisfied and lubricant requirements of individual rubbing points in a ratio of 1:100 can be satisfied accurately and simply with a single lubricating cycle.

This object is achieved in accordance with the invention in the manner that a control chamber of a pregressive distributor is connected to an outlet of the double-conduit lubricant distributor via a control line while the pressure inlet (13) of the progressive distributor in the initial segment is connected with both feed conduits behind the double-conduit lubricant distributor as seen in the direction of flow, the control chamber of the progressive distributor having no direct connection with the pressure connection (13) of the initial segment. The essence of the invention resides therefore in expanding a double-conduit central lubricating system by a progressive system, the progressive distributor being integrated in parallel into the double-conduit system. In this connection there is used a progressive distributor which per se is equipped in known manner with a control segment which sees to it that the piston of the initial segment is moved only when lubricant is fed to it from the control conduit which extends to the double-conduit lubricant distributor. The control segment is not connected with the pressure connection in the initial segment of the progressive distributor and receives its supply lubricant exclusively from the double-conduit lubricant distributor. Up to now such progressive distributors with control segment in accordance with West German Pat. No. 20 23 774 were used only for parallel connection in single-conduit progressive systems.

In order to simplify the pressure connection of the two feed conduits to the progressive distributor it is proposed, in one suitable embodiment of the invention, to effect the connection via a T and separate non-return valves. Furthermore, in order to increase the total control quantity it may be advisable to connect several double-conduit lubricant distributors one behind the other and connect their outlets with the control chamber of the progressive distributor. The central lubricating system can be expanded in a simple manner by the connection of further double-conduit lubricant distributors with progressive distributors connected in parallel, it being particularly advantageous to conduct the pressure connection to the progressive distributor at the end of the conduit over the switch device so that behind the switch device a consuming device is connected which assures a continuous change of lubricant.

Further details, features and advantages of the object of the invention will be apparent from the following description of the corresponding drawing, in the sole FIGURE of which a double-conduit lubricating system with parallelly integrated progressive distributors in accordance with the invention is shown diagrammatically.

The double-conduit central lubricating system consists of a pump 1, a 4/2-way change-over valve 2, two feed conduits I and II, double-conduit lubricant distributors 3, 4, 5 and a switch device 6 at the end of the feed conduits I and II which introduces the change-over, i.e. the change in pressure in the two feed conduits, as a function of the difference in pressure from the end of the conduit.

At pump 1 there is provided a pump which is driven by an electric motor and is capable of supplying the necessary pressure and the corresponding delivery quantity as required by the machine system to be lubricated. After the connection of the pump motor, the feed conduit I is placed under pressure and provided with lubricant; in contradistinction to the ordinary double-conduit central lubricating system, separate control conduits 7, 8 are connected to the outputs of the double-conduit lubricant distributors 3, 4, 5, each of said control conduits being connected to a control segment 9, 10 of a corresponding progressive distributor 11, 12.

The progressive distributor 11 is comprised of nine individual segments which are screwed together and sealed off from each other and each of which, with the exception of the uppermost control-conduit segment, is equipped with a piston which is pressed alternately into its two end positions by the lubricant. By means of annular grooves the pistons are so controlled in a given sequence that the next piston can be displaced only when the piston movement of the preceding piston has been practically concluded. All piston bores of the seven lower segments are connected by a central bore directly with the lubricant inlet in the initial segment which is connected via a conduit 13, a T 14 and two non-return valves 15, 16 with the two feed conduits I and II and alternately supplied by the latter with lubricant. The eighth segment is not connected by the center bore with the supply connection in the initial segment, i.e. the conduit 13 but receives only the supply lubricant for displacement of the piston from the preceding segment. Further control of the piston in the initial segment, for the purpose of further distributor circulations can accordingly be effected only by the supply lubricant via the control line 7 and the control line segment. The precise inner construction of the progressive distributor 11 and of the progressive distributor 12 which corresponds to the former except for the number of segments has not been shown in the drawing or discribed since they are already known. U.S. Pat. No. 3,783,973 illustrates such a known progressive distributor, incorporation hereby being made by reference of the disclosure thereof.

The connection of the progressive distributor 12 to the two feed conduits I and II is effected via the switch device 6 in which the development of quiescent lubricating zones is thereby avoided.

In the illustrative embodiment, the double-conduit lubricant distributors 3 and 4 give off their delivery volumes into the control conduit 7 leading to the progressive distributor 11. Two double-conduit lubricant distributors are used in this connection in order to prepare a sufficient total control quantity of 20 cc of lubricant, the two lower outlets being closed and conducted via two inner deflection channels (interrupted lines inside the distribution 3 and 4) into the two upper outlets. The amount of 20 cc is taken up by the progressive distributor 11 and given off to the rubbing points, the distributor carrying out circulation cycles corresponding to the reception volume of the lowermost initial segment and successively giving off via its outlets quantities of lubricant supplied by the feed conduit I. The quantities can be noted, by way of example, from the drawing.

After the consumption of the entire control quantity of 20 cc, the progressive distributor 11 in the example described has given off 40 cc of lubricant per outlet and has no further possibility of making further circulations. In this way there is produced an increased pressure build-up in the feed conduit I and switching is effected by the switch device 6, upon a given pressure difference, to the feed conduit II by means of the 4/2-way valve 2. The cycle described is repeated through the feed conduit II so that an additional 20 cc of lubricant are consumed as control quantity and a total of an additional 40 cc of lubricant per outlet are fed to the rubbing points via the progressive distributor 11.

Furthermore, in the example described, the second progressive distributor 12, which operates in identical manner and with the same operating cycle as the first progressive distributor 11, but is designed only for a delivery volume of 2×1 cc, is connected so that the progressive distributor 12 makes only two circulations per control cycle of the double-conduit central lubricating system and gives off 1 cc of lubricant per outlet.

It can be seen that with the system described an extremely great difference in the lubricant requirements of the individual rubbing points of 1 cc on the one hand and 80 cc on the other hand can be supplied with a single lubricating cycle. This is made possible in a surprisingly simple and economic manner.

I claim:

1. A double-conduit central lubricating system having two feed conduits supplied by a pump via a switch device which operates as a function of pressure difference and via a control valve, at least one double-conduit lubricant distributor being connected to said feed conduits, characterized by the fact that a control chamber (9, 10) of a progressive distributor (11, 12) is connected to an outlet of the double-conduit lubricant distributor (3, 4, 5) via a control conduit (7, 8) the pressure inlet, constituting a pressure connection, of said progressive distributor in the initial segment being connected with both feed conduits (I, II), the control chamber (9, 10) of the progressive distributor (11, 12) having no direct connection to the pressure connection of the initial segment.

2. A double-conduit central lubricating system according to claim 1, characterized by the fact that the connection of the initial segment to both feed conduits (I, II) is effected by a tee connector (14) with one return valve (15, 16) each.

3. A double-conduit central lubricating system according to claims 1 or 2, characterized by the fact that the outlets of a plurality of double-conduit lubricant distributors (3, 4) connected one behind the other are connected with the control chamber (9) of the progressive distributor (11).

4. A double-conduit central lubricating system according to claims 1 or 2 characterized by the fact that several progressive distributors (3, 4, 5) are integrated in parallel in the double conduit system.

5. A double-conduit central lubricating system according to claims 1 or 2 characterized by the fact that the pressure connection to the progressive distributor (12) is conducted at the conduit end over the switch device (6).

* * * * *